United States Patent
Murata et al.

(10) Patent No.: US 10,700,394 B2
(45) Date of Patent: Jun. 30, 2020

(54) BATTERY PACK

(71) Applicant: Toyota Jidosha Kabushiki Kaisha, Toyota-shi, Aichi-ken (JP)

(72) Inventors: Takashi Murata, Kasugai (JP); Masaki Hanada, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 155 days.

(21) Appl. No.: 15/683,085

(22) Filed: Aug. 22, 2017

(65) Prior Publication Data
US 2018/0062223 A1    Mar. 1, 2018

(30) Foreign Application Priority Data

Aug. 25, 2016 (JP) .................. 2016-176487

(51) Int. Cl.
| | |
|---|---|
| *H01M 10/61* | (2014.01) |
| *H01M 10/62* | (2014.01) |
| *H01M 10/615* | (2014.01) |
| *H01M 10/617* | (2014.01) |
| *H01M 2/10* | (2006.01) |
| *H01M 10/625* | (2014.01) |
| *H01M 10/6571* | (2014.01) |

(52) U.S. Cl.
CPC ....... *H01M 10/615* (2015.04); *H01M 2/1077* (2013.01); *H01M 2/1083* (2013.01); *H01M 10/617* (2015.04); *H01M 10/625* (2015.04); *H01M 10/6571* (2015.04); *H01M 2220/20* (2013.01)

(58) Field of Classification Search
CPC . H01M 10/615; H01M 10/617; H01M 10/625
See application file for complete search history.

(56) References Cited

U.S. PATENT DOCUMENTS

| | | | |
|---|---|---|---|
| 2008/0096072 A1* | 4/2008 | Fukusako | .......... H01M 2/1016 429/96 |
| 2011/0189525 A1 | 8/2011 | Palanchon et al. | |
| 2012/0107655 A1 | 5/2012 | Lee | |

(Continued)

FOREIGN PATENT DOCUMENTS

| | | | |
|---|---|---|---|
| CN | 203983425 U | 12/2014 | |
| EP | 2793310 A1 * | 10/2014 | ............ H01M 10/50 |
| EP | 2793310 A1 | 10/2014 | |

(Continued)

*Primary Examiner* — Ula C Ruddock
*Assistant Examiner* — Frank A Chernow
(74) *Attorney, Agent, or Firm* — Dinsmore & Shohl LLP (57) ABSTRACT

A battery pack includes: a lower battery module; an upper battery module stacked vertically upwardly of the lower battery module; and a heating unit provided between the lower battery module and the upper battery module, the heating unit being configured to heat the lower battery module and the upper battery module. The heating unit includes a heating line disposed at a position closer to the lower battery module relative to the upper battery module in a stacking direction of the lower battery module and the upper battery module. According to such a configuration, there can be provided a battery pack in which temperature variation is suppressed between battery modules stacked upwardly/downwardly.

5 Claims, 7 Drawing Sheets (56) References Cited

U.S. PATENT DOCUMENTS

2012/0107665 A1   5/2012   Abe et al.
2015/0188204 A1   7/2015   Hanada

FOREIGN PATENT DOCUMENTS

| JP | 2011-14436 A | 1/2011 |
| JP | 2014-143124 A | 8/2014 |
| JP | 2015-90750 A | 5/2015 |
| JP | 2015-138648 A | 7/2015 |
| JP | 2015-233017 A | 12/2015 |
| WO | 2013/088702 A1 | 6/2013 |
| WO | 2014/010252 A1 | 1/2014 |

* cited by examiner

BATTERY PACK

CROSS-REFERENCE TO RELATED APPLICATIONS

This application claims priority to Japanese Patent Application No. 2016-164687 filed on Aug. 25, 2016 with the Japan Patent Office, the entire contents of which are hereby incorporated by reference.

BACKGROUND

Field

The present disclosure relates to a battery pack.

Description of the Background Art

Regarding a conventional battery pack, for example, Japanese Patent Laying-Open No. 2014-143124 discloses a power storage device having a simple structure to securely prevent deflection of a supporting wall of a power storage cell case for containing a power storage cell therein, when stacking a plurality of such power storage cell cases in an upward/downward direction.

In the power storage device disclosed in Japanese Patent Laying-Open No. 2014-143124, each of the power storage cell cases has a supporting wall for supporting a power storage cell. A space is formed between a lower surface of the supporting wall and the power storage cell contained in the power storage cell case at a lower portion of the supporting wall. At the lower surface of the supporting wall, a reinforcement portion is provided to project toward the space.

Japanese Patent Laying-Open No. 2015-233017 is another document that discloses a conventional battery pack.

SUMMARY

As disclosed in Japanese Patent Laying-Open No. 2014-143124 described above, there has been known a battery pack including battery modules stacked upwardly/downwardly. Meanwhile, a structure having a heat generator, such as a heater, between the battery modules stacked upwardly/downwardly can be conceived in order to heat the battery modules when starting driving in a cold district or the like. However, since heat generated by the heat generator is likely to be transferred upwardly, the temperature of the upper battery module is likely to be higher than that of the lower battery module. This may result in temperature variation between the battery modules stacked upwardly/downwardly.

Therefore, in order to solve the above-described problem, the present disclosure has an object to provide a battery pack in which temperature variation is suppressed between battery modules stacked upwardly/downwardly.

A battery pack according to the present disclosure includes: a first battery module; a second battery module stacked vertically upwardly of the first battery module; and a heating unit provided between the first battery module and the second battery module, the heating unit being configured to heat the first battery module and the second battery module. The heating unit includes a heat generator disposed at a position closer to the first battery module relative to the second battery module in a stacking direction of the first battery module and the second battery module.

According to the present disclosure, there can be provided a battery pack in which temperature variation is suppressed between battery modules stacked upwardly/downwardly.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The following describes an embodiment of the present disclosure in detail with reference to figures. It should be noted that in below-described figures, the same or corresponding members are given the same numbers.

Figure 1:
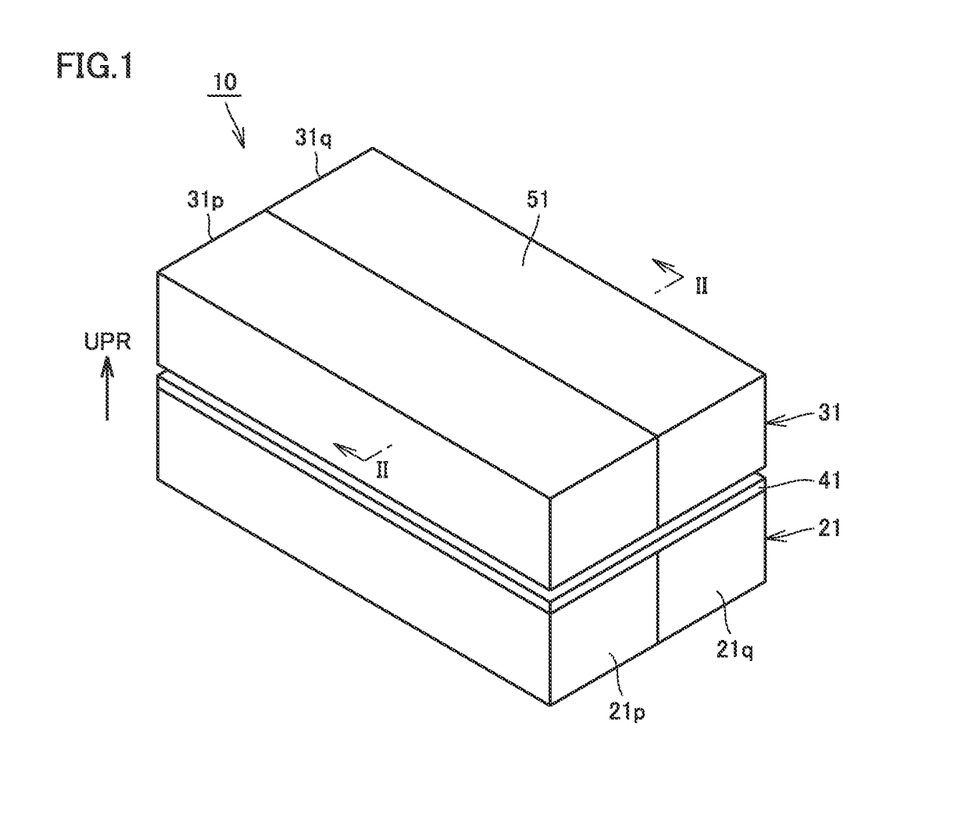
FIG. 1 is a perspective view showing a battery pack in an embodiment of the present disclosure.
Figure 2:
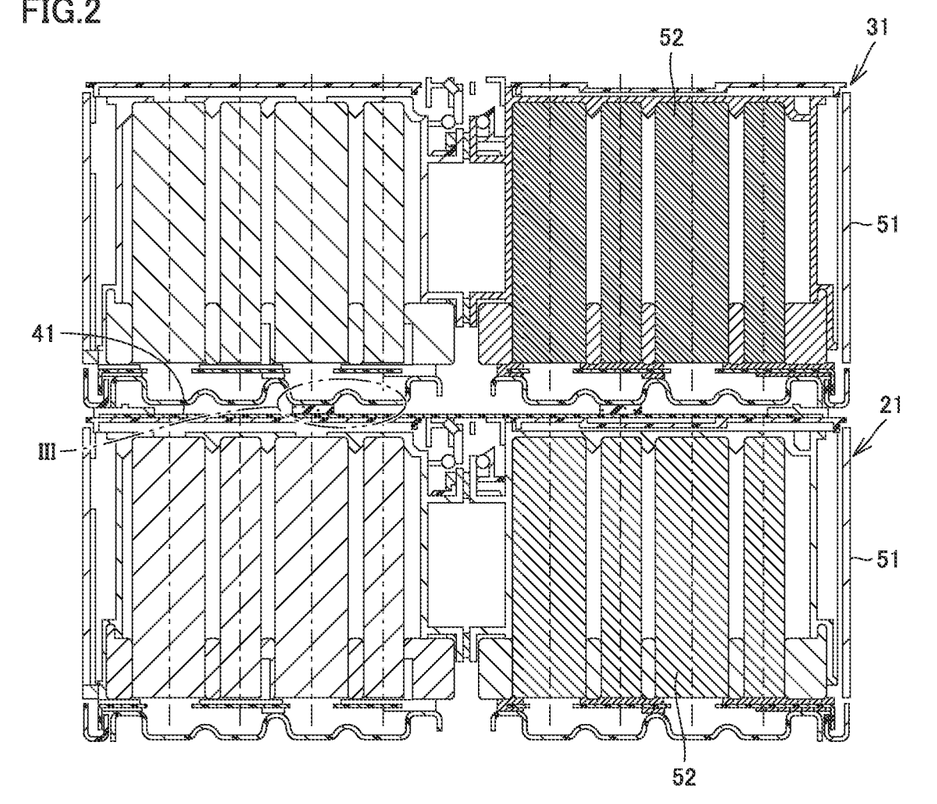
FIG. 2 is a cross sectional view showing the battery pack when viewed in a cross section along a II-II line in FIG. 1.

FIG. 1 is a perspective view showing a battery pack in the embodiment of the present disclosure. FIG. 2 is a cross sectional view showing the battery pack when viewed in a cross section along an II-II line in FIG. 1.

With reference to FIG. 1 and FIG. 2, battery pack 10 in the embodiment of the present disclosure is used to drive a vehicle, and is mounted on: a hybrid vehicle including, as a motive power source, an internal combustion engine such as a gasoline engine or diesel engine and a motor configured to be supplied with electric power from a chargeable/dischargeable battery; an externally chargeable plug-in hybrid vehicle; and an electric vehicle, for example.

Battery pack 10 has four battery modules 31p, 31q, 21p, 21q. Battery module 31p and battery module 31q are arranged side by side in a horizontal direction and are incorporated with each other. Battery module 21p and battery module 21q are arranged side by side in the horizontal direction and are incorporated with each other.

Each of four battery modules 31p, 31q, 21p, 21q has a case body 51 and a plurality of cells 52. Case body 51 constitutes an external appearance of each battery module. Case body 51 has a substantially rectangular solid shape. Case body 51 is composed of an insulating material. Case body 51 is composed of a resin material such as polypropylene.

The plurality of cells 52 are contained in case body 51. The plurality of cells 52 are electrically connected to each other in series. Each of cells 52 is a lithium ion battery. Cell 52 is not be limited to this and may be a nickel-hydrogen battery, for example. Cell 52 may have a cylinder shape or a flat-plate shape.

Battery module 31p and battery module 31q are included in an upper battery module 31. Battery module 21p and battery module 21q are included in a lower battery module 21. Each of upper battery module 31 and lower battery module 21 has a substantially rectangular solid shape. Upper battery module 31 has substantially the same size as that of lower battery module 21.

Upper battery module 31 is stacked vertically upwardly of lower battery module 21. That is, upper battery module 31 and lower battery module 21 are stacked upwardly/downwardly. Battery module 31p is disposed vertically upwardly of battery module 21p. Battery module 31q is disposed vertically upwardly of battery module 21q.

Battery pack 10 further includes a heating unit 41 configured to heat upper battery module 31 and lower battery module 21.

Heating unit 41 is provided between lower battery module 21 and upper battery module 31. Heating unit 41 has a sheet shape having a thickness direction corresponding to the stacking direction (upward/downward direction) of upper battery module 31 and lower battery module 21. When viewed in a plan view in the stacking direction of upper battery module 31 and lower battery module 21, heating unit 41 has a rectangular shape. When viewed in the stacking direction of upper battery module 31 and lower battery module 21, heating unit 41 is provided to overlap with the whole of regions in which the plurality of cells 52 are disposed. It should be noted that the shape of heating unit 41 is not limited to the sheet shape.

Figure 3:
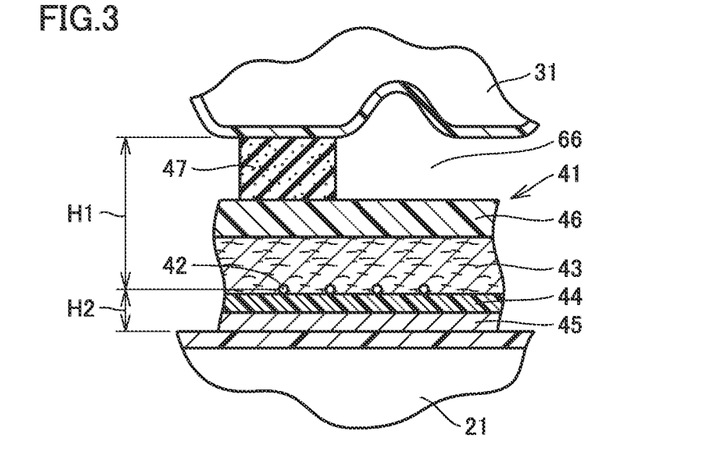
FIG. 3 is an enlarged cross sectional view showing a range surrounded by a two-point dashed line III in FIG. 2.
Figure 4:
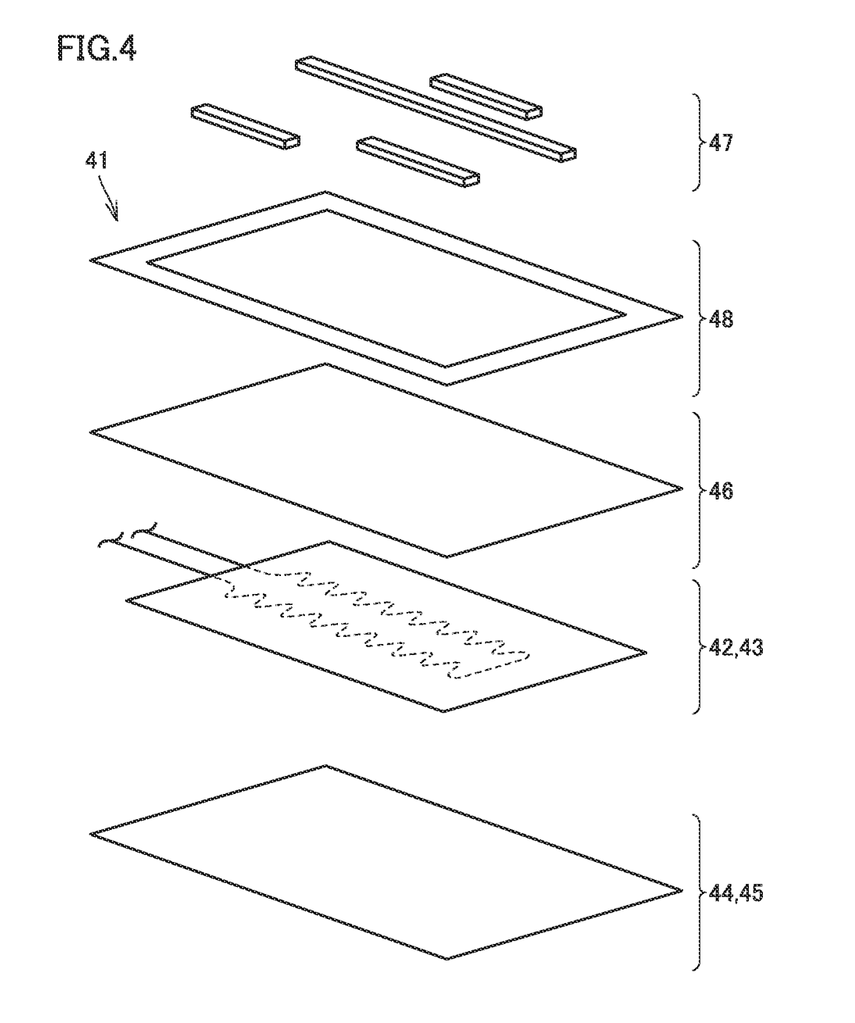
FIG. 4 is an exploded view showing a heating unit in FIG. 2.

FIG. 3 is an enlarged cross sectional view showing a range surrounded by a two-point dashed line III in FIG. 2. FIG. 4 is an exploded view showing the heating unit in FIG. 2.

With reference to FIG. 1 to FIG. 4, heating unit 41 includes a heater line (heat generator) 42, a nonwoven fabric 43, a lower insulating film 44, a heat uniformization film (thermally conductive film) 45, an upper insulating film 46, and a frame body 48.

Heater line 42 is provided as a heat generator. Heater line 42 generates heat when supplied with power. Heater line 42 extends in the form of a line within a plane orthogonal to the stacking direction of upper battery module 31 and lower battery module 21.

Heater line 42 is disposed at a position closer to lower battery module 21 relative to upper battery module 31 in the stacking direction (vertical direction) of upper battery module 31 and lower battery module 21.

More specifically, a distance (H2), in the stacking direction of upper battery module 31 and lower battery module 21, between case body 51 of lower battery module 21 and the center of heater line 42 in the stacking direction of upper battery module 31 and lower battery module 21 is smaller than a distance (H1), in the stacking direction of upper battery module 31 and lower battery module 21, between case body 51 of upper battery module 31 and the center of heater line 42 in the stacking direction of upper battery module 31 and lower battery module 21 (H1>H2). Heater line 42 is provided to be deviated to the lower battery module 21 side relative to a center position between upper battery module 31 and lower battery module 21 in the vertical direction.

Since heat generated by heater line 42 is likely to be transferred upwardly, upper battery module 31 is likely to have a more increased temperature than that of lower battery module 21. To address this, heater line 42 is provided at the position closer to lower battery module 21 relative to upper battery module 31, thereby suppressing occurrence of temperature variation between upper battery module 31 and lower battery module 21.

Heater line 42 is fixed to nonwoven fabric 43 by adhesion, sewing, or the like. Nonwoven fabric 43 has a sheet shape having a thickness direction corresponding to the stacking direction of upper battery module 31 and lower battery module 21. Heater line 42 is fixed to the surface of nonwoven fabric 43 facing lower battery module 21. Nonwoven fabric 43 serves as a base material for maintaining the shape of heater line 42 extending in the form of a line.

According to such a configuration, a thermal resistance by nonwoven fabric 43 is added between heater line 42 and upper battery module 31. Accordingly, occurrence of temperature variation between upper battery module 31 and lower battery module 21 can be suppressed more effectively.

It should be noted that in some embodiments, as the base material for maintaining the shape of heater line 42, a material having a high thermal resistance is used, such as a heat insulator such as a sponge (foam rubber) in addition to the above-described nonwoven fabric.

An air layer 66 is provided between heating unit 41 and upper battery module 31. Air layer 66 is provided between the below-described upper insulating film 46 and (case body 51 of) upper battery module 31. According to such a configuration, the thermal resistance between heater line 42 and upper battery module 31 is increased, thereby more effectively suppressing occurrence of temperature variation between upper battery module 31 and lower battery module 21.

It should be noted that a heat insulator may be provided between heating unit 41 and upper battery module 31 instead of air layer 66. However, the air layer is more advantageous than the heat insulator in view of a heat insulation effect, manufacturing cost, occurrence of temperature variation resulting from poor attachment of the heat insulator, and the like.

The following describes more specifically a structure for providing air layer 66 between heating unit 41 and upper battery module 31.

Battery pack 10 further includes an elastic body (spacer) 47. Elastic body 47 is provided between upper insulating film 46 and (case body 51 of) upper battery module 31. Elastic body 47 is provided locally within a plane orthogonal to the stacking direction of upper battery module 31 and lower battery module 21. In the present embodiment, a plurality of elastic bodies 47 extend in the form of ribs within a plane orthogonal to the stacking direction of upper battery module 31 and lower battery module 21.

Each of elastic bodies 47 is compressively deformed in the stacking direction of upper battery module 31 and lower battery module 21. Accordingly, heating unit 41 is fed with elastic force in a direction (vertically downward) from upper battery module 31 to lower battery module 21. Between upper insulating film 46 and upper battery module 31, a space is formed due to the provision of elastic bodies 47. This space constitutes air layer 66 described above.

It is concerned that heat transfer to upper battery module 31 might be facilitated via elastic bodies 47 depending on the number and sizes of elastic bodies 47. In view of this, each of elastic bodies 47 is composed of a heat insulator such as a sponge (foam rubber) in some embodiments.

Heat uniformization film 45 is provided between heater line 42 and lower battery module 21 in the stacking direction of upper battery module 31 and lower battery module 21.

Heat uniformization film 45 is provided between the below-described lower insulating film 44 and (case body 51 of) lower battery module 21 in the stacking direction of upper battery module 31 and lower battery module 21. Heat uniformization film 45 is provided in contact with lower battery module 21. Heat uniformization film 45 is composed of a material with high heat conductivity, such as aluminum.

If heater line 42 is in contact with lower battery module 21, case body 51 directly below heater line 42 is likely to have a high temperature. Accordingly, case body 51 might be thermally deteriorated during a long-time use of battery pack 10. To address this, heat uniformization film 45 is provided between heater line 42 and lower battery module 21, thereby suppressing increase of temperature of case body 51 directly below heater line 42.

Moreover, at four corners within the plane orthogonal to the stacking direction of upper battery module 31 and lower battery module 21, lower battery module 21 is likely to radiate heat, with the result that battery temperature tends to be low. To address this, heat from heater line 42 is uniformized by heat uniformization film 45 in the plane, thereby suppressing temperature variation in lower battery module 21 in the plane orthogonal to the stacking direction of upper battery module 31 and lower battery module 21.

Upper insulating film 46 is provided between heater line 42 and upper battery module 31 in the stacking direction of upper battery module 31 and lower battery module 21. Upper insulating film 46 is provided between air layer 66 and nonwoven fabric 43 in the stacking direction of upper battery module 31 and lower battery module 21. Lower insulating film 44 is provided between heater line 42 and lower battery module 21 in the stacking direction of upper battery module 31 and lower battery module 21. Lower insulating film 44 is provided between heater line 42 and heat uniformization film 45 in the stacking direction of upper battery module 31 and lower battery module 21.

Each of upper insulating film 46 and lower insulating film 44 is composed of an insulating material. Each of upper insulating film 46 and lower insulating film 44 is composed of a polyethylene terephthalate resin, for example.

Frame body 48 has a frame shape extending in the form of a strip along the circumferential edge of heating unit 41. Frame body 48 has a frame shape extending in the form of a strip along the sides of a rectangular shape. From the upper battery module 31 side, frame body 48 overlaps with the circumferential edge of upper insulating film 46. Frame body 48 is composed of a resin material. Heating unit 41 having the sheet shape is supported by frame body 48.

Upper battery module 31 and lower battery module 21 are provided to interpose frame body 48 therebetween in the stacking direction of upper battery module 31 and lower battery module 21. According to such a configuration, a distance between upper battery module 31 and lower battery module 21 can be set uniformly. Furthermore, frame body 48 may be used to fix heating unit 41 to upper battery module 31 and lower battery module 21.

The above-described structure of battery pack 10 in the embodiment of the present disclosure will be summarized as follows. That is, battery pack 10 in the present embodiment includes: lower battery module 21 serving as a first battery module; upper battery module 31 serving as a second battery module and stacked vertically upwardly of lower battery module 21; and heating unit 41 provided between lower battery module 21 and upper battery module 31, heating unit 41 being configured to heat lower battery module 21 and upper battery module 31. Heating unit 41 includes heater line 42 serving as a heat generator, heater line 42 being disposed at a position closer to lower battery module 21 relative to upper battery module 31 in the stacking direction of lower battery module 21 and upper battery module 31.

According to battery pack 10 thus configured in the embodiment of the present disclosure, occurrence of temperature variation can be suppressed between upper battery module 31 and lower battery module 21 stacked upwardly/downwardly.

Figure 5:
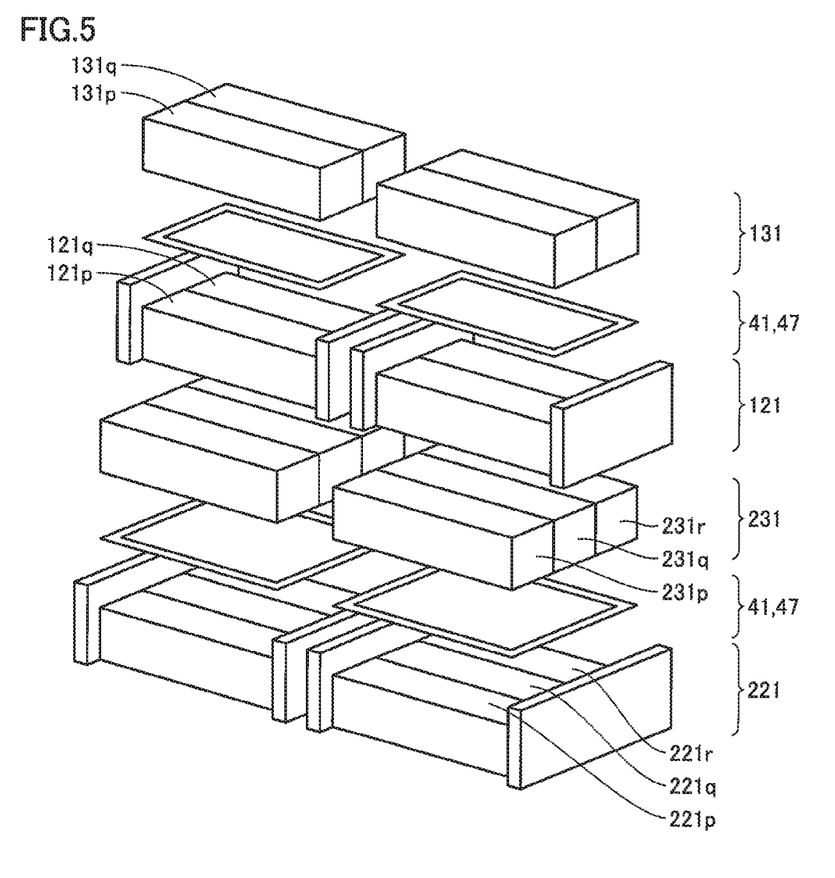
FIG. 5 is an exploded view showing a modification of the battery pack in FIG. 1.

FIG. 5 is an exploded view showing a modification of the battery pack in FIG. 1. With reference to FIG. 5, the battery pack in the present modification includes: an upper battery module 131 and a lower battery module 121; and an upper battery module 231 and a lower battery module 221. Upper battery module 131 and lower battery module 121 are stacked vertically upwardly of upper battery module 231 and lower battery module 221.

Upper battery module 131 includes two battery modules 131*p*, 131*q*, and lower battery module 121 includes two battery modules 121*p*, 121*q*. Upper battery module 131 and lower battery module 121 are stacked upwardly/downwardly with heating unit 41 being interposed therebetween. Between upper battery module 131 and heating unit 41, an air layer is formed by providing elastic body 47 therebetween.

Upper battery module 231 includes three battery modules 231*p*, 231*q*, 231*r*, and lower battery module 221 includes three battery modules 221*p*, 221*q*, 221*r*. Upper battery module 231 and lower battery module 221 are stacked upwardly/downwardly with heating unit 41 being interposed therebetween. Between upper battery module 231 and heating unit 41, an air layer is formed by providing elastic body 47 therebetween.

Also according to such a configuration, occurrence of temperature variation can be suppressed between upper battery module 131 and lower battery module 121 stacked upwardly/downwardly, and occurrence of temperature variation can be suppressed between upper battery module 231 and lower battery module 221 stacked upwardly/downwardly.

Next, the following describes an examination for checking function and effect of the battery pack in the present disclosure, as well as a result thereof.

Figure 6:
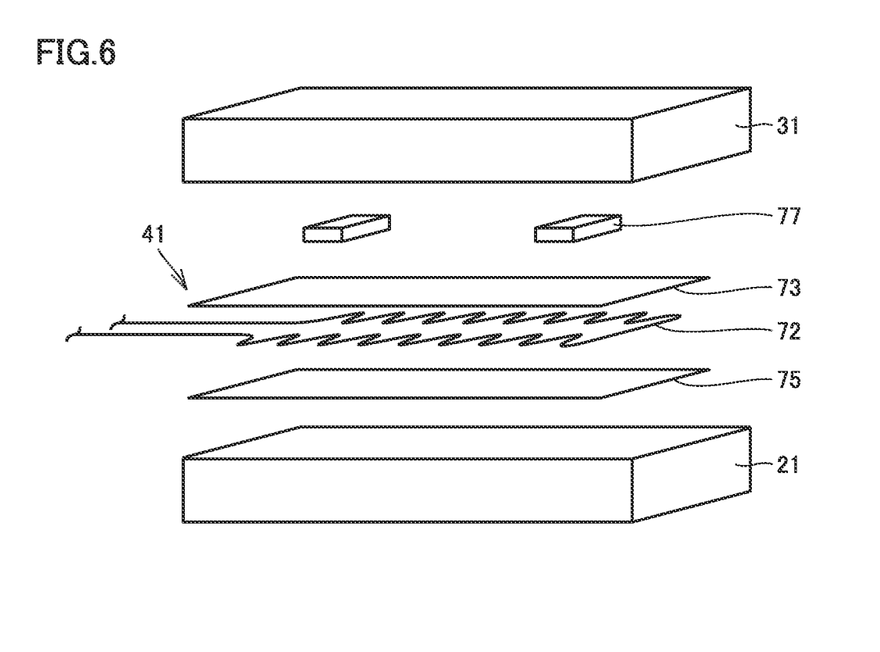
FIG. 6 is an exploded view showing a battery pack used to evaluate a temperature of the battery module.
Figure 7:
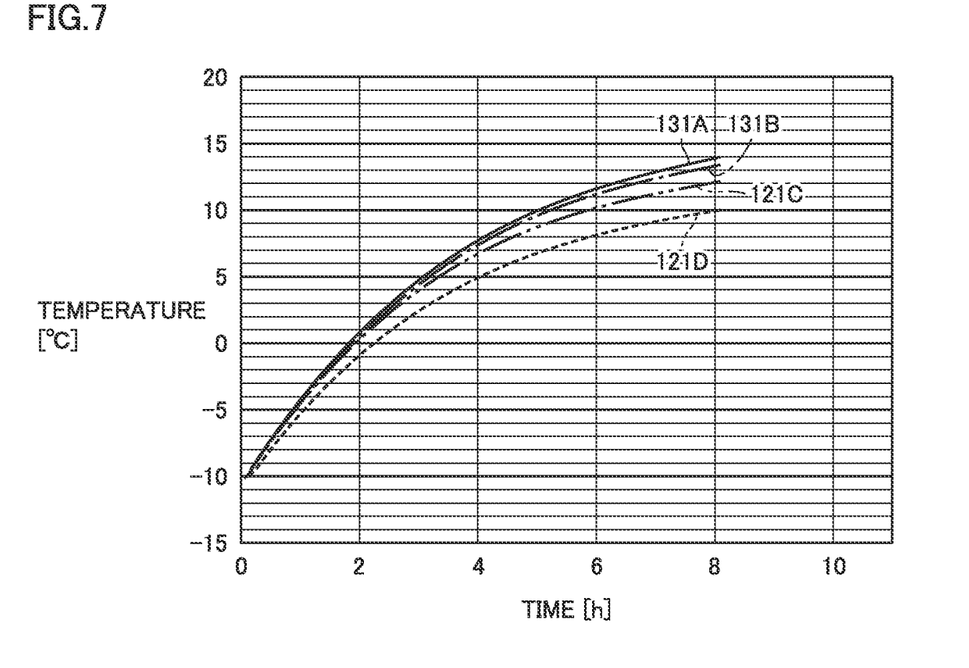
FIG. 7 is a graph showing a relation between passage of time and a temperature of the battery module.

FIG. 6 is an exploded view showing the battery pack used to evaluate a temperature of the battery module. FIG. 7 is a graph showing a relation between passage of time and a temperature of the battery module.

With reference to FIG. 6 and FIG. 7, in this examination, heating unit 41 having heater line 72 and nonwoven fabric 73 (total thickness of 1.0 mm) as well as aluminum film 75 was used, and spacers 77 (thickness of 3.0 mm) were provided between upper battery module 31 and heating unit 41. Accordingly, heater line 72 was disposed at a position closer to lower battery module 21 relative to upper battery module 31. A distance between upper battery module 31 and lower battery module 21 was set at about 4 mm, and the size of the space (air layer) between heating unit 41 and upper battery module 31 was set at 3 mm.

Heater line 72 was supplied with power of 13.2 W. A temperature change of each of upper battery module 31 and lower battery module 21 with passage of time after starting the supply of power was measured. In FIG. 7, curves 131A and 131B represent temperature changes at different portions of upper battery module 31, whereas curves 121C and 121D represent temperature changes at different portions of lower battery module 21. Temperature variation between upper battery module 31 and lower battery module 21 after passage of 8 hours could be suppressed to 4.1° C.

Figure 8:
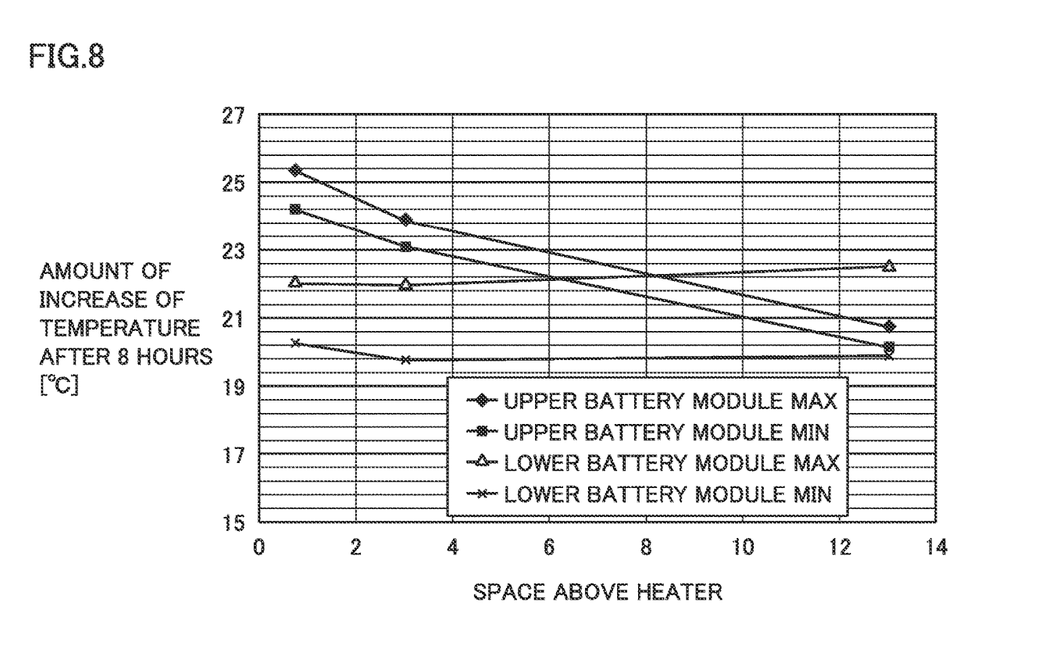
FIG. 8 is a graph showing a relation between an amount of increase of temperature after passage of 8 hours and the size of a space between the heating unit and an upper battery module.

FIG. 8 is a graph showing a relation between an amount of increase of temperature after passage of 8 hours and the size of the space between the heating unit and the upper battery module.

With reference to FIG. 6 and FIG. 8, next, a plurality of battery packs having different sizes of spaces between heating units 41 and upper battery modules 31 were prepared by adjusting the thicknesses of spacers 77. In each battery pack, the amount of increase of temperature of each of upper battery module 31 and lower battery module 21 after passage of 8 hours was measured.

In this examination, the amount of increase of temperature of upper battery module 31 after passage of 8 hours became small as the space between heating unit 41 and upper battery module 31 was larger. When the space between heating unit 41 and upper battery module 31 was 3 mm, the temperature variation between upper battery module 31 and lower battery module 21 was 4.1° C., whereas when the space between heating unit 41 and upper battery module 31 was 13 mm, the temperature variation between upper battery module 31 and lower battery module 21 was 2.6° C.

Figure 9:
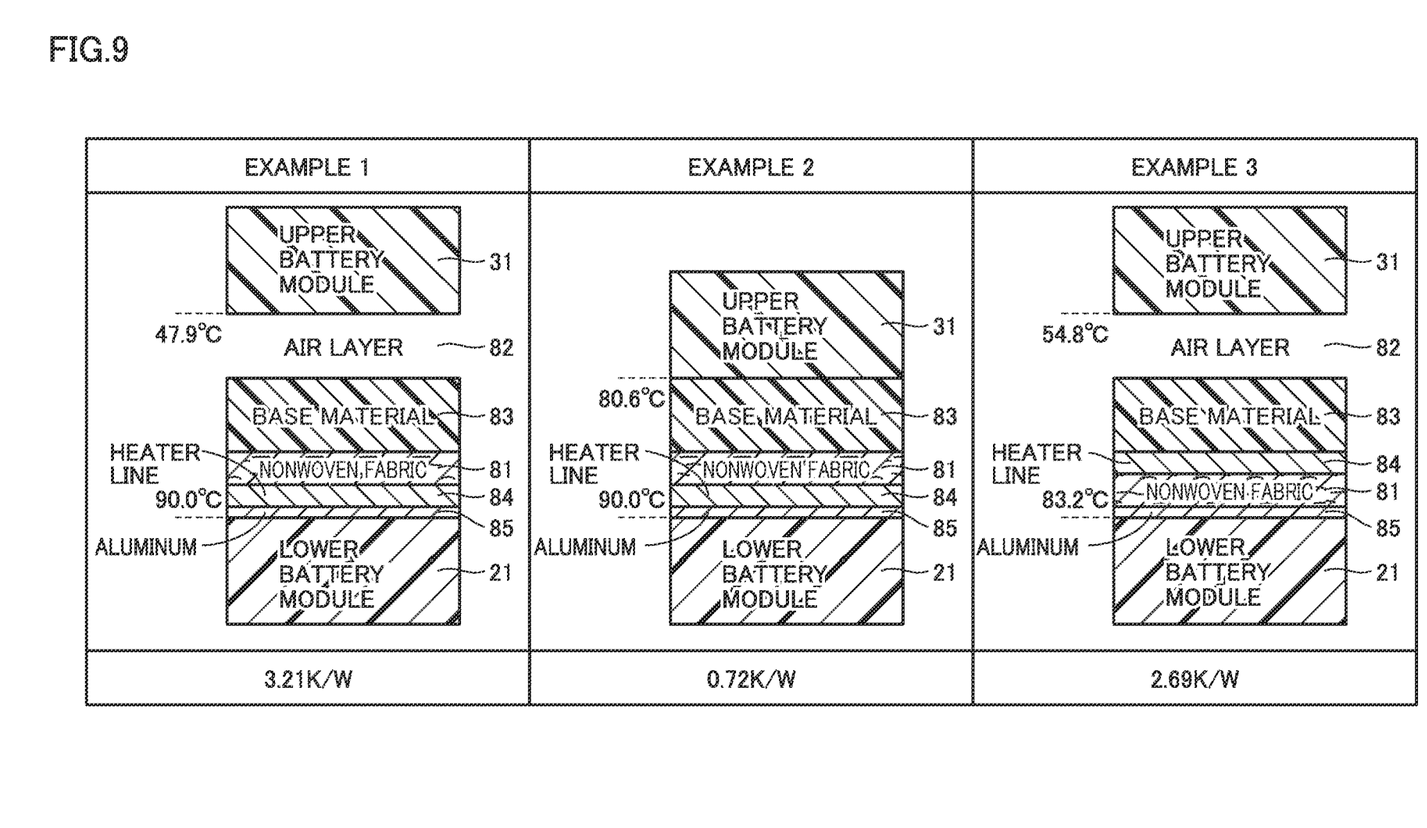
FIG. 9 is a table showing a relation between an arrangement of air layer and nonwoven fabric and a thermal resistance between a heater line and the upper battery module.

FIG. 9 is a table showing a relation between an arrangement of the air layer and nonwoven fabric and a thermal resistance between the heater line and the upper battery module.

With reference to FIG. 9, battery packs in Examples 1 to 3 were considered. In the battery pack in Example 1, air layer 82 (thickness of 1.8 mm), base material 83 (thickness of 1.2 mm), nonwoven fabric 81 (thickness of 0.5 mm), heater line 84 (thickness of 0.4 mm), and aluminum film 85 (thickness of 0.1 mm) are provided on one another in this order in the direction from upper battery module 31 to lower battery module 21. Base material 83 serves as both upper insulating film 46 and frame body 48 in FIG. 4, and has a flat-plate shape as a whole. Heater line 84 has a rectangular shape with a size of 100 mm×300 mm (the same applies to Example 2 and Example 3).

In the battery pack in Example 2, base material 83 (thickness of 1.2 mm), nonwoven fabric 81 (thickness of 0.5 mm), heater line 84 (thickness of 0.4 mm), and aluminum film 85 (thickness of 0.1 mm) are provided on one another in this order in the direction from upper battery module 31 to lower battery module 21.

With the battery pack in Example 3, air layer 82 (thickness of 1.8 mm), base material 83 (thickness of 1.2 mm), heater line 84 (thickness of 0.4 mm), nonwoven fabric 81 (thickness of 0.5 mm), and aluminum film 85 (thickness of 0.1 mm) are provided on one another in this order in the direction from upper battery module 31 to lower battery module 21.

In each of Examples 1 to 3, a thermal resistance value between heater line 84 and upper battery module 31 was determined. As a result, a thermal resistance value between heater line 84 and upper battery module 31 was the highest in Example 1 in which air layer 82 and nonwoven fabric 81 were provided between heater line 84 and upper battery module 31.

A battery pack according to the present disclosure includes: a first battery module; a second battery module stacked vertically upwardly of the first battery module; and a heating unit provided between the first battery module and the second battery module, the heating unit being configured to heat the first battery module and the second battery module. The heating unit includes a heat generator disposed at a position closer to the first battery module relative to the second battery module in a stacking direction of the first battery module and the second battery module.

According to the battery pack thus configured, the heat generator is disposed at the position closer to the first battery module, to which the heat from the heat generator is less likely to be transferred, relative to the second battery module, to which the heat from the heat generator is more likely to be transferred. Hence, occurrence of temperature variation can be suppressed between the first battery module and the second battery module.

Moreover, a heat insulating layer is provided between the second battery module and the heating unit.

According to the battery pack thus configured, with the heat insulating layer, the heat can be less likely to be transferred from the heat generator to the second battery module.

Moreover, the battery pack further includes a spacer between the second battery module and the heating unit to form an air layer between the second battery module and the heating unit.

According to the battery pack thus configured, with the air layer formed by providing the spacer therebetween, the heat can be less likely to be transferred from the heat generator to the second battery module.

Moreover, the heating unit has a sheet shape having a thickness direction corresponding to the stacking direction of the first battery module and the second battery module.

According to the battery pack thus configured, temperature variation can be suppressed between the first battery module and the second battery module in the battery pack having the heating unit with the sheet shape.

Moreover, the heating unit further includes a thermally conductive film disposed between the heat generator and the first battery module in the stacking direction of the first battery module and the second battery module.

According to the battery pack thus configured, variation can be suppressed in a manner of transferring the heat from the heat generator to the first battery module in the plane direction in which the heating unit with the sheet shape is disposed.

Moreover, the heating unit further includes a frame body provided along a circumferential edge of the heating unit. The first battery module and the second battery module are provided to interpose the frame body therebetween in the stacking direction of the first battery module and the second battery module.

According to the battery pack thus configured, the heating unit with the sheet shape can be supported by the frame body. Moreover, the frame body can be used to position the first battery module and the second battery module.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery pack comprising:
   a first battery module;
   a second battery module stacked vertically upwardly of the first battery module; and
   a heating unit provided between the first battery module and the second battery module, the heating unit being configured to heat the first battery module and the second battery module, the heating unit including a heat generator disposed at a position closer to the first battery module relative to the second battery module in a stacking direction of the first battery module and the second battery module, wherein a heat insulating layer is provided between the second battery module and the heating unit, and a thermal resistive member composed of a nonwoven fabric or a heat insulator is provided between the heat generator and the heat insulating layer.

2. The battery pack according to claim 1, further comprising a spacer between the second battery module and the heating unit to form an air layer between the second battery module and the heating unit.

3. The battery pack according to claim 1, wherein the heating unit has a sheet shape having a thickness direction corresponding to the stacking direction of the first battery module and the second battery module.

4. The battery pack according to claim 3, wherein the heating unit further includes a thermally conductive film disposed between the heat generator and the first battery module in the stacking direction of the first battery module and the second battery module.

5. The battery pack according to claim 3, wherein the heating unit further includes a frame body provided along a circumferential edge of the heating unit, and the first battery module and the second battery module are provided to interpose the frame body therebetween in the stacking direction of the first battery module and the second battery module.

* * * * *

UNITED STATES PATENT AND TRADEMARK OFFICE
CERTIFICATE OF CORRECTION

| | |
|---|---|
| PATENT NO. | : 10,700,394 B2 |
| APPLICATION NO. | : 15/683085 |
| DATED | : June 30, 2020 |
| INVENTOR(S) | : Takashi Murata and Masaki Hanada |

It is certified that error appears in the above-identified patent and that said Letters Patent is hereby corrected as shown below:

On the Title Page

Item (30), Foreign Application Priority Data, delete "2016-176487" and insert --2016-164687--, therefor.

Signed and Sealed this
Tenth Day of November, 2020

Andrei Iancu
*Director of the United States Patent and Trademark Office*